United States Patent [19]

Wallace

[11] 4,081,012

[45] * Mar. 28, 1978

[54] THREAD LOCK

[75] Inventor: Richard B. Wallace, Bloomfield Hills, Mich.

[73] Assignee: The Oakland Corporation, Troy, Mich.

[*] Notice: The portion of the term of this patent subsequent to Nov. 22, 1994, has been disclaimed.

[21] Appl. No.: 675,789

[22] Filed: Apr. 12, 1976

Related U.S. Application Data

[63] Continuation-in-part of Ser. No. 550,831, Feb. 18, 1976.

[51] Int. Cl.$^2$ ............................................. F16B 39/02
[52] U.S. Cl. ................................................... 151/14.5
[58] Field of Search .................... 151/14.5, 7; 85/1 C, 85/10 F; 427/410, 428

[56] References Cited

U.S. PATENT DOCUMENTS

| | | | |
|---|---|---|---|
| 3,061,455 | 10/1962 | Anthony | 151/7 X |
| 3,757,828 | 9/1973 | Frauenglass et al. | 151/7 X |
| 3,787,222 | 1/1974 | Duffy | 151/7 X |
| 3,893,496 | 7/1975 | Wallace et al. | 151/14.5 |

FOREIGN PATENT DOCUMENTS

| | | | |
|---|---|---|---|
| 945,669 | 1/1964 | United Kingdom | 151/14.5 |

Primary Examiner—Ramon S. Britts
Attorney, Agent, or Firm—Whittemore, Hulbert & Belknap

[57] ABSTRACT

Thread locking structure in which the separate fluid parts of a two-part adhesive (such as an epoxy resin and an activator) are applied in circumferentially related relation to the threads of a threaded member such as a bolt. At least one pair of adjacent edges of the deposits are in contact and the parts are covered with a single protective sealing film such for example as polyvinyl alcohol. One or both of the deposits contains a substantial percentage of particles of polymerized resin such for example as nylon. At the zone where the two different deposits flow together, the materials react and produce a barrier film which limits the reaction and keeps it from spreading circumferentially beyond the narrow zone.

9 Claims, 4 Drawing Figures

U.S. Patent  March 28, 1978  4,081,012
FIG. 1
FIG. 2
FIG. 4
FIG. 3
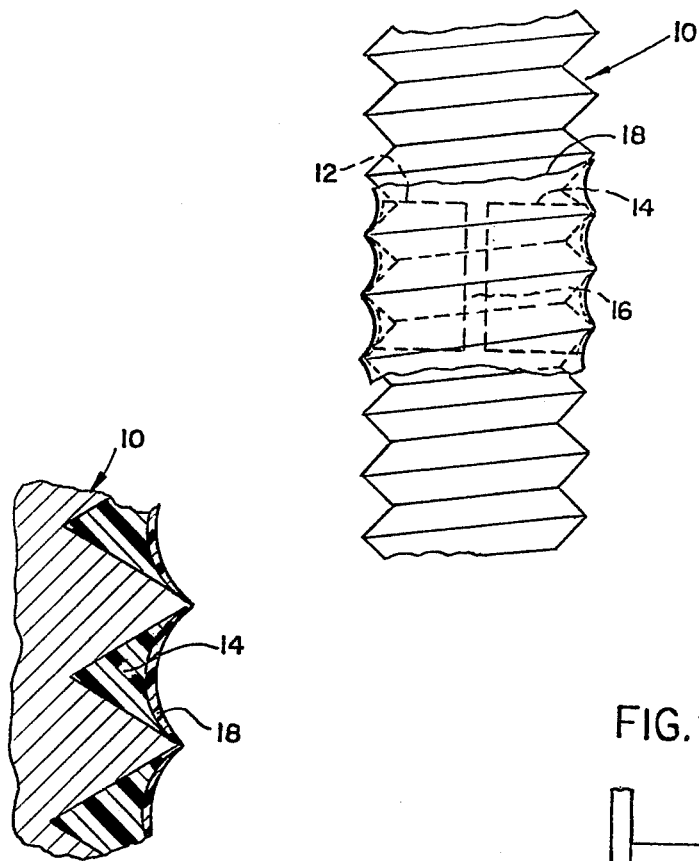
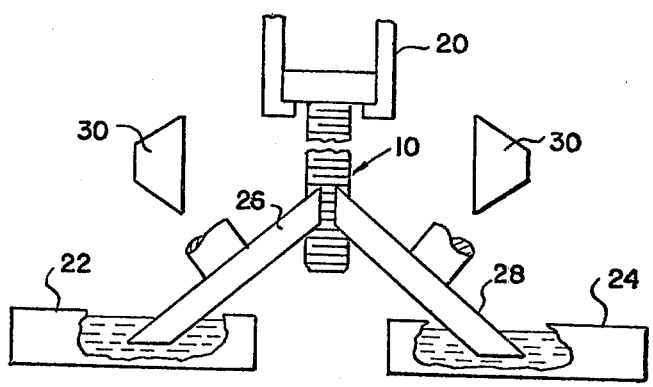
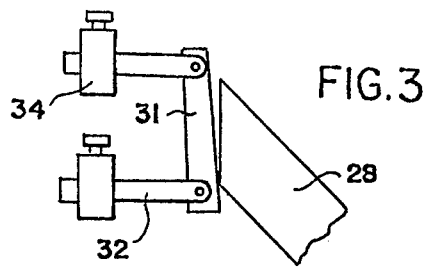

THREAD LOCK

CROSS-REFERENCE TO RELATED APPLICATION

This is a Continuation-in-Part of my prior copending application, Ser. No. 550,831, filed Feb. 18, 1975, now abandoned.

BRIEF SUMMARY OF THE INVENTION

The simple form of the invention is the application of a multiple-part, preferably a two-part, adhesive to the threads of an external threaded member such as a bolt to produce a novel self-locking device. In a typical example the two-part adhesive is essentially an epoxy resin in uncured fluid condition, and the other part of the adhesive is the activator which is also applied and preferably remains in a fluid condition.

The individual parts of the multiple adhesive are applied in circumferentially related relation to a threaded portion of the bolt or other body. In a simple form of the invention each constituent of the two-part adhesive occupies approximately 180° around the threaded portion, the edges of each deposit of the adhesive material abutting. It has been found that where an edge of the resin deposit in a thread groove abuts the edge of a deposit of the activator in the thread groove, the activator and resin react to set up a narrow barrier zone which prevents further reaction between the activator and resin while importantly providing an aid to mixing of the adhesive parts during later thread engagement.

The resin and activator are applied in fluid form and at least one constituent remains in fluid form. It is accordingly necessary to protect the fluid deposit so as to provide treated bolts or the like which may be intermingled without adhering together. This is readily accomplished by providing a very thin protective film over the deposits of the two-part adhesive. Such a film for example, may be provided by a water-based solution of polyvinyl alcohol (PVA) which may be applied in a spray form or by dipping, followed by a drying ooeration in which the polyvinyl alcohol becomes a thin non-tacky protective sealing film.

In use, as the companion threaded member, such for example as a nut, is threaded over the zone provided with the deposits of the two-part adhesive, the protective film is dislodged and the fluid resin is caused to be progressively intermingled with the activator so that setting up of the resin is initiated.

In the above identified parent application the disclosure was of a fluid resin and activator, neither of which was provided with a solid filler material. In many cases it was found that the application of the resin or activator was not under perfect control because of the high fluidity which tended to cause the fluid material to flow away from the thread grooves during shipment and storage.

In accordance with the present invention a substantial percentage of solid particles of reacted or polymerized material, such for example as nylon or teflon are provided in either the fluid resin, the fluid activator, or both. The presence of the finely divided solid particles in the fluid reduces the fluidity and permits deposit of the material to precisely the zone which it is to occupy, and may be varied to control the stability of the deposit during normal handling and storage therefor.

It has been found that this solid finely divided material has the additional important function of improving intermixture between the resin and the activator with the result that more complete and uniform polymerization of the resin takes place.

In addition to this, an entirely unexpected and highly advantageous result has been found to occur. This improved function is the capability of the material to function during multiple uses.

BRIEF DESCRIPTION OF THE DRAWING

FIG. 1 is an enlarged view illustrating a portion of an externally threaded member provided with two or more components of a multiple-part adhesive and covered with a protective film.

FIG. 2 is a diagrammatic view illustrating a preferred mode of application of the adhesive and activator to threaded members.

FIG. 3 is a diagrammatic view illustrating the use of a doctor blade with the applicator rolls.

FIG. 4 is an enlarged sectional view through a deposit in a thread groove.

DETAILED DESCRIPTION

As disclosed in my prior copending application identified above, the present invention is the application of a multiple-part, preferably a two-part, friction material to the threads of a threaded member such as a bolt or nut to produce a novel self-locking device. In a typical example, which is the preferred embodiment of the invention, the two-part adhesive is essentially an epoxy resin deposited in uncured fluid condition, and the other part of the adhesive is the activator for the epoxy which is also applied and preferably remains in a fluid condition until the two separate parts of the friction material react.

Referring now to the drawing, in FIG. 1 there is shown a threaded member 10 which may be in the form of a bolt, on which a plurality of deposits 12 and 14 of a multiple-part friction material is applied. The two parts of the adhesive may each occupy substantially 180° of the threaded member, although the proportions may vary, and the edges of the deposits 10 and 12 are in contact. Where the edge of the deposit of the activator, which may be the deposit 12, contacts the edge of the deposit of the resin, which may be the deposit 14, there is an interaction providing a relatively narrow zone 16 which constitutes a barrier against further reaction between the resin and activator. This reaction is therefore self-limiting, and results in very thin barriers, which being solid constitute mechanical mixing elements when the threaded parts are engaged.

Overlying the deposits 12 and 14 is a protective film 18 which may be in the form of a dried film of polyvinyl alcohol (PVA), which may be of a thickness as small as 0.0005 inch to 0.0015 inch, as best illustrated in the enlarged fragmentary section of FIG. 4.

While the friction material may be selected from known two-part resins and activators both available in fluid or liquid condition, the preferred friction material is the result of reacting well known unreacted epoxy resins in fluid condition with equally well known activators also provided in fluid condition. Epoxy resin adheres tightly to the metal surfaces of the engaged thread surfaces, and provides a locking action which prevents inadvertent loosening or separation between the threaded parts. A suitable activator is a liquid aliphatic amine. These fluid or liquid materials are applied to the threaded member 10 to form deposits in the thread groove which may fill the thread groove to a substantial depth of from one-quarter (¼) to as much as 90%, and occupies the thread groove as best seen in FIG. 4.

After the unreacted resin and activator or other parts of a multiple friction material are applied, and while they remain in fluid condition, they are covered with a protective coating of polyvinyl alcohol, which may be applied in the form of a spray or a coating resulting from immersion of the article.

In use, as the mating threaded member is threaded onto the body 10, the mechanical engagement of the threads of the companion member dislodges the thin protective film 18 and ruptures the barrier 16 and permits intimate mechanical intermingling between the resin and activator or other components of a multi-part friction material. Continued thread engagement initiates setting up or hardening of the adhesive and ultimately produces a secure interlock between the threaded members. In order to supplement the mixing effect of the dislodged film 18 and to insure a complete and uniform intimate mixture between the resin and activator, the present invention contemplates the addition of substantial percentages of solid particles of suitable resins, preferably nylon or teflon. These particles are of a size such that they will be agitated by the moving clearance of the particular thread and may be intimately mixed with the fluid resin and activator. During the period of storage and pre-engagement the principal function of the particles is to control fluidity so as to produce the tendency of the resin and activator to flow along the threads so as to leave a deposit of less than required thickness. By controlling the amount of solid particulate material, the fluidity may be such as to permit the application of a coating of precisely the required thickness or depth in the thread groove, with the assurance that it will remain in position.

The foregoing is a particularly valuable function of the inclusion of nylon particles in the liquid components where they are applied as explained below, by rollers which for convenience are driven by common drive means at the same speed. Thus, variation in viscosity of the materials is the simplest means of controlling the relative quantity of material deposited by each roller and for controlling the relative circumferential flow characteristics once the material is on the threads.

A second very important function of the solid particulate material is that it serves as mechanical means insuring an intimate and uniform intermixture of the fluid resin and activator. This action is also to some extent provided by the PVA film which breaks down into solid pieces as well as the barrier 16.

A third important advantage of the use of the solid resin particles is in reducing friction during initial use of the threaded part. The fluid activator for epoxy resin, preferably a liquid aliphatic amine, is a negative lubricant. Industry requirements specify a minimum clamp pressure for a given torque, or a torque-tension ratio, and the fluid activator, hardener or catalyst may result in a torque-tension ratio outside the acceptable range. The inclusion of the nylon reduces the torque required to produce a given clamping pressure at the first application during which the epoxy and activator are both liquid.

In addition to the foregoing, a further unexpected but highly valuable advantage attributable to the addition of nylon particles is that it provides for multiple reusability.

In the history of thread locking devices, early successful commercial applications were the use of nylon pellets seated in recesses formed in the threaded part to project radially to interfere frictionally with the mating part, or more recently, the provision of a so-called nylon patch adhered by fusion to a limited area of the threads. Another commercially successful prior application was the use of epoxy resin which is cured or activated from a fluid state in the thread space after the threaded parts have been threaded together.

The older nylon pellet and patch applications had high installation torque including the initial installation, reasonably high reusability, but a fairly low lock effect, which had to be compatible with installation torque.

The use of post-installation cured epoxy resin, set-up or cured in the clearance space between threads of mating parts involved different applications, which included separately microencapsulated resin and activator, the micro-capsules being ruptured as the parts were initially engaged. The micro-capsules were set or embedded in a suitable adhesive which tended to increase initial installation torque with a resultant increase in torque-tension ratio, which is an undesirable feature. More important however, the epoxy, when curred, tended to become quite brittle. This provided an excellent lock at the first usage, but when the parts were unscrewed, epoxy at the broken joint became granular and glass-like. When the parts were reconnected, the torque locking action suffered drastically, and by the third use the locking action was negligible.

The present invention combines the best features of the different prior systems, with the elimination of objectionable features. Reusability is much desired by industry as an indication of conformability and recovery, but post-application cure of the epoxy is also highly desirable because of ease of initial installation while the epoxy is fluid. The older nylon pellet and patch devices had high installation torque, high reusability, and lower locking action. The prior post-application cured epoxy resin devices in some cases had substantial initial installation torque, very high initial locking action, but very low if any reusability.

Devices constructed as disclosed herein have almost zero initial installation torque, very high locking action, and excellent reusability with high torque retention.

In a preferred embodiment of the invention, the solid particles are provided in each of the fluid resin and activator so as to constitute approximately 50% by volume thereof. This percentage is not particularly critical and will be varied in accordance with other requirements so as to constitute between 10 and 90% of the fluid deposits.

The particle size may vary somewhat depending upon the space between the mating threads, but in general a typical solid particulate material may be considered as a nylon powder having a particle size of approximately 0.004 inch.

In prior U.S. Pat. No. 3,893,496, of which I am a joint inventor, disclosure was made of the addition of solid particulate material such as fly ash, finely chopped glass fibers, and more particularly nylon powder. This solid material was intermixed with the resin which in that case was an acrylic resin, which was reacted before use to provide an externally dry or non-tacky deposit on the threads of the threaded member. The powdered material was provided in the previous invention for the primary purpose of improving the sealing action tending to prevent leakage along a thread under high pressure conditions and also to permit higher temperature resistance in use, as well as permitting a reduced drying time.

In the present case the nylon powder has quite different functions; namely, (1) the control of the fluidity or viscosity of the liquid resin and activator; (2) the enhancement of the mixing action between the resin and activator as the threaded parts undergo relative rotation; and (3) the imparting to the product of unexpectedly high reusability and the retention of friction or torque resistance in subsequent usages far beyond anthing which might have been anticipated.

Referring now to FIG. 2 there is illustrated a preferred method of producing the thread lock construction. Here, a series of threaded members such as the bolts 10 are advanced by suitable conveying means diagrammatically indicated at 20 with the axes of the threaded members 10 extending vertically. Adjacent the path of advance of the threaded members 10 are provided reservoirs 22 and 24 which contain supplies of the two parts of the two-part adhesive such for example as the epoxy adhesive and activator. Associated with the reservoirs 22 and 24 are applicator rollers 26 and 28 the peripheral portions of which are frusto-conical in shape as illustrated. The material of the applicators may be relatively soft such for example as deep pile, a spongy construction, or the like, so that the peripheral portion thereof contacting the threaded portion of the threaded member may be distorted to extend around a desired angular extent of the threaded member. For example, in an extreme case each applicator 26, 28 may apply its adhesive component to approximately 180° of the threaded portion.

It will of course be observed that the zones contacted by the applicators 26 and 28 are diametrically opposite each other so that in the finished product, the deposits illustrated at 12 and 14 in FIG. 1, are circumferentially related.

The fluid adhesive components in the reservoirs 22 and 24 are applied to the members while these members are at an elevated temperature, as for example 130° F. For this purpose the threaded members are advanced through a heating zone characterized by radiant heating elements 30 designed to produce the desired temperature. This of course raises the temperature of the threaded member and conditions it for most efficient operation during the deposit of adhesive and activator.

A very thin sealing protective film is then applied to overlie the deposits 12 and 14. Conveniently, this may be accomplished by providing fine spray elements at opposite sides of the conveyor adapted to deposit a continuous thin film of a sealing member such as polyvinyl alcohol to completely cover the deposits 12 and 14. Since the threaded members at this time are at an elevated temperature, deposition of the thin spray of film forming material is followed immediately by drying of the film to a solid non-tacky protective film which permits the parts to be intermingled at random without adhering together. At the same time the thin protective film is readily ruptured by the simple application of the threaded parts to a mating member.

It will be noted that the deposits 12 and 14 are shown as spaced from the lower end of the member 10. However, this is not essential, but represents a valuable option available in the present invention.

Since the materials are in fluid form, they introduce no appreciable friction torque and in fact, may act as a lubricant. Accordingly, the deposits may extend to the very end of threaded member. It is noted that in no case do the deposits extend beyond the O.D. of the threads.

Referring now to FIG. 3 there is illustrated a fragmentary diagrammatic view showing the use of a doctor blade 31 adjacent the edge of an applicator roll 28 so as to provide for a thickness of deposit which is variable. For this purpose the doctor blade 31 is illustrated as carried by adjustable arms 32 each of which is adjustable in a support clamp 34. With this arrangement, it is possible to apply a deposit to a vertically elongated zone at one side of a threaded member 10 which is of variable thickness vertically. As illustrated, a heavier deposit of the adhesive (either the resin or the activator) is applied at the upper portion of the zone to which the fluid adhesive is applied. The fluid material, after deposit by the roller onto the threads of the member, flows downwardly and around the threads to an extent determined by the controlled viscosity thereof. By properly selecting the angularity and spacing of the doctor blade 31 from the periphery of the applicator roll 28, each deposit may be made to assume uniform thickness after deposit.

In the past it has been proposed to use micro-encapsulated epoxy adhesives and activators but these have required a "bedding" compound for the capsules as a result of which torque of 10-30 inch/pounds as in the case of ⅜ inch diameter threads, have been required to engage the mating threaded elements. In the present case the adhesive deposits are in the form of viscous liquids opposing only negligible torques to engagement of the threaded parts, thus providing a near-effortless installation along with a favorable torque/tension ratio upon seating.

The unusual thinness and toughness of the polyvinyl alcohol film permits the use and ultimate "dry" handling and boxing of such soft and flowable coating materials. It is apparently also effective to produce a slight extrusion effect along the thread grooves in which a mixing process between the resin and activator takes place at the first encroachment of the mating thread and before the PVA is torn, which is apparently no later than the second half turn of engagement. The torn segments of the PVA coating continue the mechanical mixing during relative rotation of the threaded parts. The ruptured barrier portions act in the same way along with the nylon particles.

While the specific disclosure in the foregoing contemplates the provision of each deposit of the two-part adhesive to probably approximately 180° in the same circumferentially related zone, it will of course be apparent, particularly where larger diameter parts are provided, that a multiplicity of separated zones of each of the components of the adhesive may be arranged intermediate a final multiplicity of circumferentially relates zones of the other component.

Where, for example, a large threaded member is to be applied with a plurality of deposits of the same adhesive component, this may be accomplished in two steps by providing at diametrically opposite, angularly limited zones deposits of the same material by the operation illustrated in FIG. 2. Thereafter, the threaded elements may be rotated 60° and advanced between a second pair of applicators which will apply the second component of the adhesive to the zones intermediate the deposits previously applied, etc.

It is of course possible to provide one of the adhesive components over more than 180°, with a second component disposed between the circumferentially spaced edges thereof, depending on the epoxy/activator combination being used.

Reference is made to U.S. Pat. No. 3,814,156 which discloses several different multiple-part adhesives which may be used in the practice of the present invention.

While the disclosed circumferentially adjacent deposits illustrated and described is preferred, it will be understood that axially adjacent deposits may be employed. Alternatively, each deposit may be applied in a spiral. In all cases at least one, and preferably two, pair of adjacent deposit edges are in contact, with a barrier formation resulting from the interaction between the adhesive parts.

What I claim as my invention is:

1. A thread lock construction comprising a body having threads formed thereon, a deposit of one part of a two-part friction and locking material in the thread grooves at a first zone comprising a plurality of consecutive threads on said body, said deposit extending only partially around said threads, a second deposit of the other part of said material on substantially the same consecutive threads and extending only partly around said threads at a second zone circumferentially adjacent said first zone, at least one pair of edges of said deposits being adjacent each other, said deposits being fluid and capable of being spread by engagement with a mating threaded body, a narrow barrier zone of solid material formed by reaction between contacting edge portions of said deposits and in contact with the adjacent edge portions of the still-fluid deposits and constituting a barrier therebetween, and a rupturable thin film of dry non-tacky protective material overlying both of said deposits and barrier zone engaged with a mating threaded member, at least one of said deposits including 10-90% by volume of finely divided solid resin particles.

2. A construction as defined in claim 1 in which one of said parts is essentially unreacted fluid epoxy resin.

3. A construction as defined in claim 2 in which the other of said parts is an activator in the form of a liquid aliphatic amine.

4. A construction as defined in claim 1 in which said finely divided solid resin particles are nylon or teflon.

5. A construction as defined in claim 2 in which said finely divided solid resin particles are nylon or teflon.

6. A construction as defined in claim 1 in which said solid resin particles have a particle size of about 0.0004 inch.

7. A construction as defined in claim 5 in which said solid resin particles have a particle size of about 0.0004 inch.

8. A construction as defined in claim 1 in which the fluid deposits in said two zones flow together to bring edges thereof into contact, and a barrier between said two deposits formed by reaction between said deposits which limits the reaction between said zones before engagement with a mating threaded part and aids in mixing during such engagement.

9. A construction as defined in claim 8 in which said parts are an unreacted fluid resin and a fluid activator therefor, and in which said barrier is a solid reaction product of said resin and activator.

* * * * *